United States Patent Office.

WILLIAM J. HOWARD, OF LOUISVILLE, KENTUCKY.

FOOD PRODUCT AND METHOD OF PREPARING SAME.

SPECIFICATION forming part of Letters Patent No. 692,667, dated February 4, 1902.

Application filed December 14, 1901. Serial No. 85,959. (No specimens.)

*To all whom it may concern:*

Be it known that I, WILLIAM J. HOWARD, a citizen of the United States, residing at Louisville, in the county of Jefferson and State of Kentucky, have invented certain new and useful Improvements in Processes of Preserving Chilli-Con-Carne and Preserved Products Thereof; and I do declare the following to be a full, clear, and exact description of the invention, such as will enable others skilled in the art to which it appertains to make and use the same.

My invention relates to the preservation of food material for use at any time desired, and especially has for its object the provision of a process for preparing the material known as "chilli-con-carne," whereby it may be canned and put up in cakes and will remain in good condition for use for an indefinite period.

Chilli-con-carne is a well-known Mexican dish, the ingredients of which consist of Mexican chilli-pepper, oragno, camino, chilli-relish, chopped beef, beef fat, garlic, and salt. As now prepared the fat is rendered, the beef, chopped into small cubes the size of small dice, is fried in said rendered fat till about two-thirds done, and the ingredients above-named are then added with about as much water in bulk as the other materials make, after which the composition is boiled about twenty minutes, thickened with flour, when it makes a thick and palatable soup, but must be consumed immediately. Heretofore no means of keeping it fit for subsequent use has been devised. The object of my invention, as hereinabove stated, is to overcome this disadvantage.

To this end the invention consists in the process hereinafter described and in the product produced thereby.

In accordance with my process the beef suet is rendered as heretofore, but there is employed about twice the quantity that is used when the compound is to be used immediately, for a most important purpose hereinafter stated. The beef cut into cubes, as heretofore, is then fried in the rendered suet, as at present, being constantly stirred until all the natural juices are dried out of it. The chilli-pepper is subjected to individual treatment, which consists in baking the same to get rid of all rank moisture, and it is then ground and added to the fried meat and they are cooked together until the mixture no longer steams, said mixture being stirred constantly during this step of the process. After this step of the process has been completed the oragno, camino, chilli-relish, and garlic are added in the order named; but I wish to call particular attention to the fact that the garlic must previously have been subjected to individual treatment, (not necessary when the material is intended for immediate consumption,) consisting in frying the same separately and pouring off therefrom all the grease before it is introduced into the mixture. This individual treatment of the garlic preserves it and prevents tainting or destruction of the mixture, which would occur if the garlic in its original condition were cooked with the mixture, as heretofore.

It was hereinabove stated that about twice the usual quantity of suet is employed. The purpose of this is to cause the suet to fill the interstices in the compound and bind the ingredients thereof together and when it hardens seal the same against the admission of air thereto.

The result of the above process is the production of a product which is nearly dry and of which the ingredients are bound together by a sealing material composed of one of the essential ingredients employed in the production of chilli-con-carne. The product may be put in cans or molded into cakes of suitable size and will remain fit for use indefinitely.

To prepare a can or cake of the compound for the table, all that is necessary is to mix the material with a suitable quantity of water, boil it for fifteen or twenty minutes, and thicken with flour, when it is ready for use.

Having thus described the invention, what I believe to be new, and desire to secure by Letters Patent, is—

1. The process herein described of preparing chilli-con-carne for preservation and deferred use, consisting in partly frying meat in rendered suet, subjecting the chilli-pepper prior to its introduction into the mixture to individual treatment to eliminate rank moisture therefrom, and also frying the garlic separately and removing the grease before its introduction into the mixture; cooking said pepper and partly-fried meat in the presence of each other; and finally adding the oragno, camino, chilli-relish and treated garlic and cementing all by rendered suet, substantially as described.

2. The herein-described preserved product of the kind stated, embracing in addition to cooked meat, oragno, camino, and chilli-relish, chilli-pepper treated to remove moisture therefrom, and fried garlic from which grease has been eliminated, said ingredients being cemented together and sealed against the admission of air thereto by hardened rendered suet, substantially as described.

In testimony whereof I affix my signature in presence of two witnesses.

WILLIAM J. HOWARD.

Witnesses:
J. RICHARDSON,
JNO. B. TILFORD.